Figure 2:
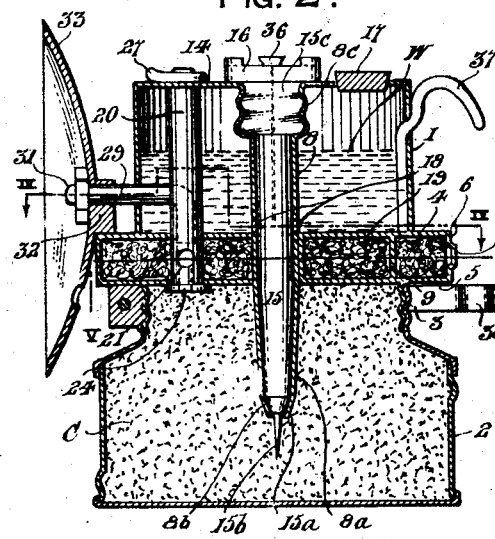

Sept. 1, 1925.

J. MENAPACE

MINER'S LAMP

Filed Jan. 3, 1924

1,552,218

Inventor
J. Menapace
By F.A.H. Bryant
Attorney.

Patented Sept. 1, 1925.

1,552,218

UNITED STATES PATENT OFFICE.

JOSEPH MENAPACE, OF LATUDA, UTAH.

MINER'S LAMP.

Application filed January 3, 1924. Serial No. 684,211.

*To all whom it may concern:*

Be it known that I, JOSEPH MENAPACE, a subject of the King of Italy, residing at Latuda, in the county of Carbon and State of Utah, have invented certain new and useful Improvements in Miners' Lamps, of which the following is a specification.

This invention relates to certain new and useful improvements in miners' lamps and particularly to a lamp of carbide type adapted for either attachment to a belt or cap.

The primary object of the invention is to provide a miner's carbide lamp wherein a lamp casing comprising an upper water compartment and a lower carbide compartment is provided with an intermediate chamber constructed to provide a tortuous passage and filled with a suitable gas filtering material or packing through which the gas generated in the lower carbide chamber passes to the burner tip.

With the above and other objects in view that will become apparent as the nature of the invention is better understood, the same consists of the novel form, combination and arrangement of parts hereinafter more fully described, shown in the accompanying drawing and claimed.

In the drawing, wherein like reference characters designate corresponding parts throughout the several views.

Figure 1:
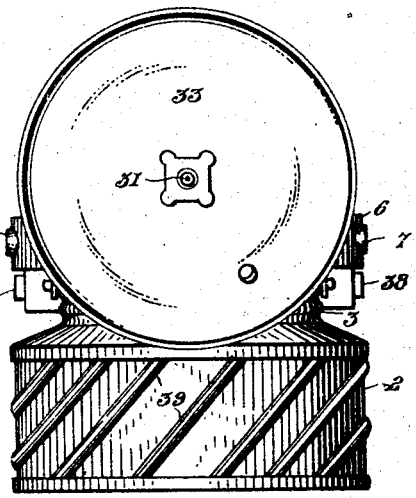
Figure 3:
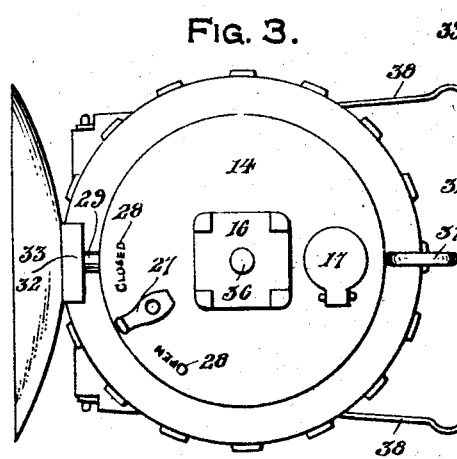
Figure 4:
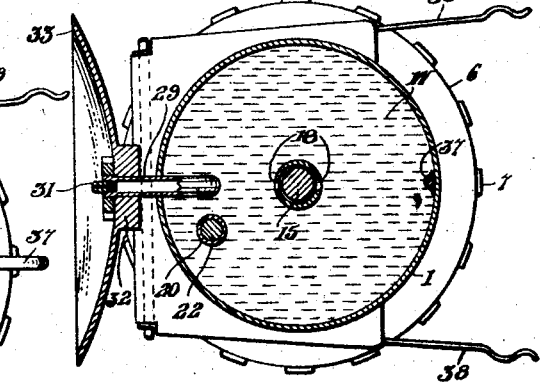
Figure 6:
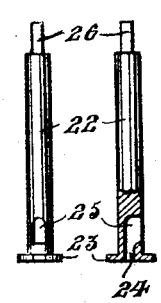
Figure 7:
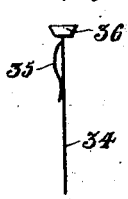
Figure 5:
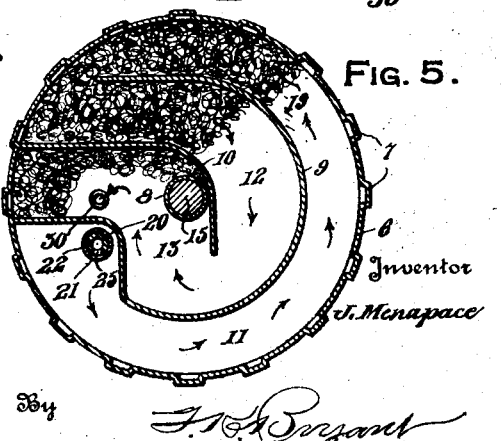

Figure 1 is a front elevational view of a miner's carbide lamp constructed in accordance with the present invention, Figure 2 is a vertical sectional view of the lamp showing the upper water chamber, the lower carbide chamber in valved communication therewith and the intermediate gas filtering chamber, Figure 3 is a top plan view of the lamp, Figure 4 is a horizontal sectional view taken on line IV—IV of Fig. 2, Figure 5 is a horizontal sectional view taken on line V—V of Fig. 2 looking upwardly, and showing the tortuous passage filled with packing or filtering material in the gas filtering chamber, Figure 6 shows side elevational views of the valve structure controlling the flow of gas to the burner tip, and Figure 7 is a side elevational view of a lamp pick carried by the lamp.

Referring more in detail to the accompanying drawing, there is illustrated a miner's carbide lamp including a casing, preferably of cylindrical formation and embodying upper and lower sections 1 and 2 respectively having a threaded connection 3 as shown in Fig. 2. The lower end of the upper section 1 that is connected to the lower section 2 is provided with a gas filtering chamber embodying upper and lower walls 4 and 5 formed integral with the upper section 1 and connected by an outer annular wall 6 provided with outwardly directed protuberances 7 to facilitate gripping of the upper section when the same is mounted upon the lower section 2. The upper and lower walls 4 and 5 of the gas filtering chamber are provided with axial openings through which the tubular member 8 extends to form a closure therefor as shown in Fig. 2, and to render the gas chamber air tight. The gas chamber is provided with a series of internal baffles or veins 9 and 10 of the form illustrated in Fig. 5 to provide tortuous passages 11, 12 and 13 as indicated by the arrows and through which passages the gas flows.

The tubular member 8 extending through the gas chamber projects downwardly into the lower section 2 of the lamp casing and is downwardly tapered as at $8^a$ with the terminal lower end thereof further tapered as at $8^b$ to form a valve seat. An enlargement of screw formation as shown at $8^c$ in Fig. 2 is formed adjacent the upper end of the tubular member 8 within the upper section 1 and is preferably formed integral with the top wall 14 of the upper section. A valve stem 15 is positioned in the tubular member 8 and has a tapering valve $15^a$ at its lower end that engages the valve seat $8^b$ and further carries a needle point $15^b$ projecting through the lower open end of the tubular member 8 to clear a water passage therethrough. The upper end of the valve stem —c— carries an enlarged screw block $15^c$ working in the enlarged threaded portion $8^c$ of the tubular member and further carries an operating head 16 disposed above the top wall 14 of the upper section 1 for manipulating the valve stem 15. Water W is placed in the upper section 1 of the lamp casing through an opening in the top wall 14 thereof that is closed by the hinged stopper 17, and carbide C is placed in the lower section 2 of the lamp when the upper and lower sections are separated at their threaded connection. Side openings 18 are formed in the tubular member 8 adjacent the upper wall 4 of the gas chamber and when the valve stem 15 is partially elevated by operating the head 16 thereof, water flows from the upper section 1 through the tubular member and escapes at the lower open end thereof into the lower section or carbide chamber.

The tortuous passages in the gas chamber are filled with packing or filtering material 19 and the flowing of gas generated in the lower section 2 to the gas chamber is controlled by valve mechanism including a tubular member 20 that extends from the top wall 14 of the upper section 1 downwardly through the lower wall 5 of the gas chamber at one end of the passage 11 as shown in Figs. 2 and 5. The tubular member 20 within the gas chamber is provided with a side opening 21 and a valve stem 22 rotatable in the tubular member 20 controls the opening and closing of the opening 21. The valve stem 22 carries an outwardly directed annular flange 23 at its lower end that engages the bottom wall 5 of the gas chamber and the lower end of said valve stem is provided with an angle opening having an axial portion 24 extending through the lower end of the valve stem 22 and a communicating side opening 25 located within the tubular member 20 and adapted to be moved into registration with the opening 21 in said tubular member upon rotation of the valve stem. A key end 26 is carried by the upper end of the valve stem 22 and upon which a handle 27 is fixed as shown in Figs. 2 and 3, legends 28 upon the top wall 14 of the upper section cooperating with the handle 27 to indicate when the valve stem 22 has been shifted to either an open or closed position.

The burner includes an angle pipe having a horizontal leg 29 extending through the side wall of the upper section 1 and an inner depending vertical leg 30 disposed at the end of the passage 13 as shown in Fig. 5. the lower end of the burner pipe section 30 extending through the upper wall 4 of the gas chamber and terminating at a point above the bottom wall 5 thereof. A burner tip 31 is carried by the outer end of the horizontal leg 29 of the burner pipe and passes through the axial bearing block 32 of the reflector plate 33, the peripheral edge of the gas chamber extending outwardly of the side wall of the upper lamp section 1 to provide a support for the reflector block 32 as shown in Fig. 2.

The lamp pick 34 carrying a spring arm 35 adjacent the head 36 thereof is adapted to be carried in a relatively small axial opening formed in the upper end of the valve stem 15 as shown in Fig. 2 and is capable of ready extraction for cleaning the tip of the lamp burner. A hook 37 is associated with the upper section 1 for mounting the lamp upon the cap of a miner while the spring arms 38 are provided to further maintain a rigid support therefor. Outwardly projecting ribs 39 are carried by the side wall of the lower section 2 to provide a gripping surface combined with the protuberances 7 to facilitate the connection and disassembling of the lamp section.

While there is herein shown and described the preferred embodiment of the present invention, it is nevertheless to be understood that minor changes may be made therein without departing from the spirit and scope of the invention as claimed.

What is claimed as new is:—

In a device of the kind described having a lower carbide and gas generating chamber and an upper water chamber, a filtering chamber interposed between the lower and upper chambers and having a peripheral wall, top and bottom walls having peripheries conforming to the shape of the peripheral wall and engaging therewith, baffle plates each fitting between the top and bottom walls and having one end engaging said peripheral wall, said baffle plates having their remaining end portions curved in opposite directions, and means to permit gas to flow into the filtering chamber at one point and to flow out therefrom at another point.

In testimony whereof I affix my signature.

JOSEPH MENAPACE.